June 25, 1957 R. SHEPPARD 2,796,748
SOLID COUPLING ASSEMBLY WITH CENTERING PLUG
Filed Oct. 19, 1954
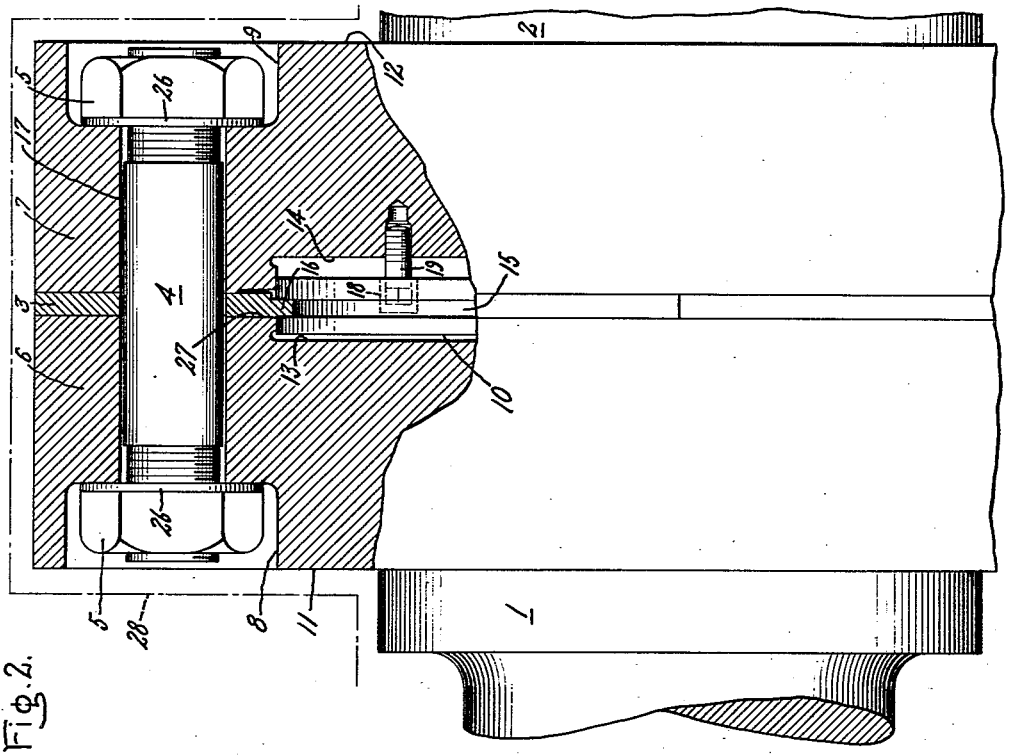
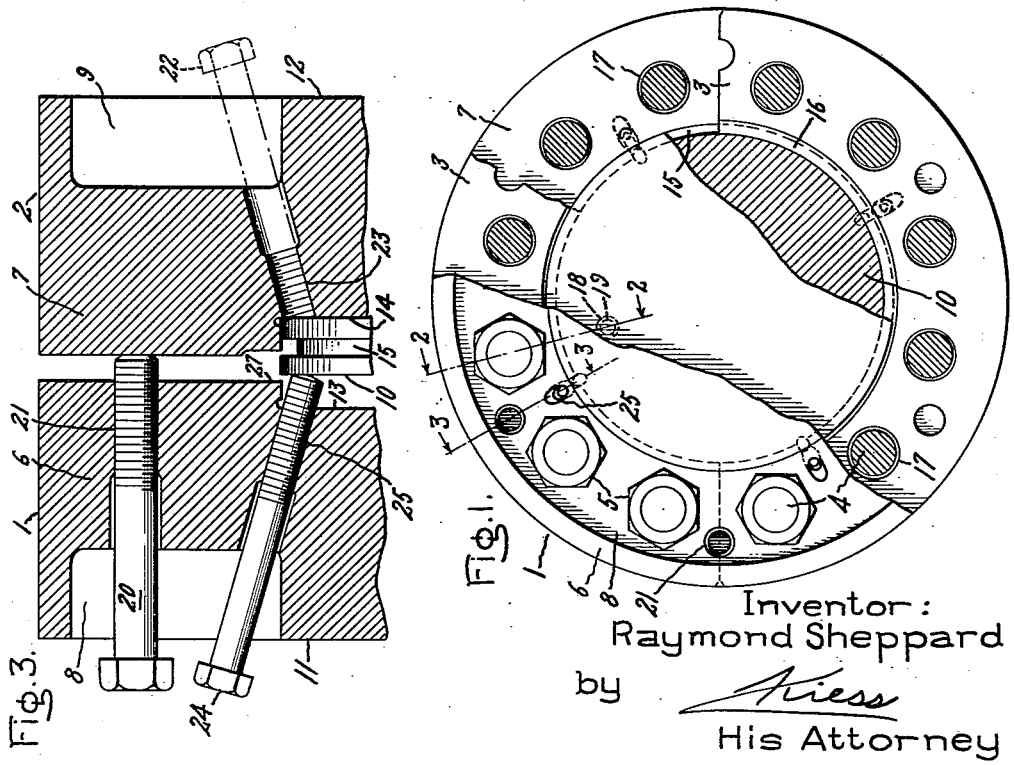
Inventor:
Raymond Sheppard
by  *Kiess*
His Attorney

2,796,748
Patented June 25, 1957

2,796,748

SOLID COUPLING ASSEMBLY WITH CENTERING PLUG

Raymond Sheppard, Schenectady, N. Y., assignor to General Electric Company, a corporation of New York Application October 19, 1954, Serial No. 463,095

5 Claims. (Cl. 64—1)

This invention relates to a coupling device and particularly to such a device used to couple together two rotors of an elastic fluid turbine.

A typical method used to connect two turbine rotors was to bolt the rotors together allowing for standard clearances and to center the rotors relative to each other by a fixed rabbet formed on one rotor which projected into a recess defined by the mating half. However, to remove one of the rotors it was necessary to bodily jack the turbine casing alternately with the rotor a total of ½" to ¾" until the rotor was free of the centering rabbet. This alternate jacking method is required due to the small clearances, on the order of .030" to .050", between the buckets and the stationary nozzles. Another method to couple together rotors having flat faced flanges was to use tapered bolts to both fasten and center the rotors relative to each other. Other fastening means, such as "body-bound" bolts, for centering the rotors have also been used. The main disadvantage in these latter two methods is the difficult manufacturing problems involved.

A coupling arrangement in accordance with the invention includes a plug located between and engaging suitable rabbets in adjacent portions of the two rotors for centering the rotors relative to each other. When the centrifugal forces acting on the rotors are not very large, a centering plug, made of the same material as the rotor proves very satisfactory. However, in a modern high-speed turbine, the large centrifugal forces form a diametral clearance between the plug and the rotor at rated speeds. This diametral clearance allows the plug to run loose and thus destroys its centering effect. This is an intolerable condition because complete dependence would then be placed upon the friction provided by the bolts connecting the rotors together.

Accordingly, an object of this invention is to provide an improved centering arrangement for a coupling of the type described which will remain tight regardless of the high centrifugal forces, and the attendant expansion relative thereto, imposed on the coupling at high rotational speeds.

A further object is to provide a centering assembly for high-speed rotors which can be quickly and easily assembled and disassembled.

Other objects and advantages will be apparent from the specification and claims and accompanying drawings which illustrate an embodiment of the invention, in which Fig. 1 is an end view partially broken away showing the coupling and the centering plug; Fig. 2 is an enlarged-scale fragmentary side elevation of the coupling, a portion being broken away and shown in section, as indicated by the line 2—2 of Fig. 1; and Fig. 3 is an enlarged-scale sectional view showing how the flanges can be uncoupled by various jack bolts and thus illustrating the method of disassembly, the view corresponding in location to the line 3—3 of Fig. 1.

Generally stated, the invention is practiced by providing a solid-flange-coupling assembly with a centering plug specially designed to maintain the coupled members centered during high-speed operation.

Referring first to Fig. 1, there is shown a partial sectional view of a coupling assembly including a high-pressure turbine rotor 1, a low-pressure turbine rotor 2, a spacer 3 for centering the rotor while the coupling is being assembled, and a centering plug 10 for maintaining the rotors centered relative to each other. The spacer 3 is ring shaped and is made in two or more arcuate sections to permit assembly. The rotors 1, 2 are connected together by a circumferential row of coupling bolts 4, and nuts 5 which are located in flange portions 6, 7 of the rotors 1, 2 respectively.

Referring now to Fig. 2, the rotors 1, 2 are secured together by the bolt and nut means 4, 5. The bolt extends through holes 17 defined in the flanges 6, 7, which may be formed integral with the rotors 1, 2. The bolt holes end in annular recesses 8, 9 at exterior surfaces 11, 12 of the flanges 6, 7 respectively. Located between the nuts 5 and the flanges 6, 7 are lock washers 26. The nuts are disposed in the recesses 8, 9 to reduce the windage losses around the coupling.

The rotors 1, 2 define a pair of circular recesses 13, 14 which are located adjacent one another when the rotors are bolted together. A solid cylindrical centering plug 10 is disposed in the mating recesses 13, 14. With a shaft coupling on the order of 25" outside diameter and a plug on the order of 15" diameter, the plug is made approximately .001" larger in diameter than its corresponding recess. The plug therefore, defines an "interference fit" with the recesses. The circular recess 14 is made sufficiently deep so that the plug 10 may be moved axially thereinto as shown in Fig. 3 to permit removal of either rotor relative to the other.

The centering plug defines a circumferential groove 15. Into this groove extends a circumferential lip 16 on the spacer member 3 for preventing axial movement of the plug. The centering plug also defines a recess 18 adapted to fit over a pin 19 which is threaded into the rotor 2. This pin arrangement prevents the plug 10 from being inserted into the recess 13 in the wrong direction.

As illustrated, the members coupled together here are rotors capable of operation at various speeds. During rotation, centrifugal forces are set up which will tend to expand the coupling flanges 6, 7 relative to the plug 10. In relatively low-speed turbines, the expansion caused by centrifugal force thus acting on the coupling is not large enough to overcome the interference fit of the centering plug. Therefore, in relatively low-speed turbines the centering plug and rotors may be made of the same material (usually a suitable ferritic steel).

However, at high rotational speeds of present day turbines, for instance 3600 R. P. M., the diametral clearance formed between the coupling and the centering plug due to the large centrifugal forces set up may be on the order of .004 to .005 inch. If this expansion were to be allowed without any compensation by the centering plug, it can be seen that the plug 10 would no longer serve as an accurate centering means for the two rotors. The plug 10 would then rotate freely in recesses 13, 14, to the extent permitted by the pin 19. With the centering plug loose at running speed, complete dependence for the accurate centering of the two rotors would be placed on the friction provided by the bolts 4. The bolts however are normally provided with small clearances, which would allow the faces of the flanged couplings to slip relative to one another if friction did not hold them.

This invention takes advantage of the fact that the coupling parts tend to operate at temperatures which may be 100 to 200 degrees F. higher than the initial temperature of the coupling at rest. This temperature rise results from the heating effect of the surrounding air, The air around the coupling is confined in a relatively small space by the adjacent turbine casing 28, and is heated by friction and "windage losses" due to the high rotational speed of the coupling. This temperature differential is utilized to effect automatic compensation for the expansion caused by the high centrifugal forces on the rotor during the extremely high speeds at which it is operated.

To this end, the centering plug 10 is designed so as to expand at normal operating conditions. For instance it may be constructed of a material which has a substantially higher coefficient of thermal expansion than the rotors 1, 2. This material is so chosen that the thermal expansion of the plug at the normal operating temperature will substantially compensate for the expansion of the flanges caused by the high centrifugal forces. It is noted that the rotor end portions will also expand thermally and that the coefficient of expansion of the plug has to be substantially greater than that of the rotor end portions so that expansion of the plug will compensate for both centrifugal force and thermal expansion of the rotors.

Typical materials that could be used would be ferritic steel for the flanges 6, 7 and an "austenitic" or stainless steel for the centering plug 10. However, it is to be noted that any materials could be used in which the differential thermal expansion of the materials would be such as to cause the centering plug to expand thermally so as to follow the expansion of the flanges caused by the high centrifugal forces on the coupling at high speeds.

Fig. 3 shows the rotors in the uncoupled position whereby they can be moved relative to each other, as described more specifically hereinafter.

The coupling assembly is assembled in the following manner.

The rotors 1, 2 are set at their proper axial location in the machine castings, and the space between the flanges 6, 7 is measured to determine the proper thickness for spacer 3. The centering plug 10 is located in recess 14 in rotor 2 as shown in Fig. 3. The coupling flanges 6, 7 are then separated by inserting jack bolts 20 in the threaded holes 21 and bringing them to bear against rotor 2. A temporary spacer member, generally similar to spacer 3 but having no circumferential lip 16 is inserted between the flanges 6, 7 for maintaining the two rotors centered when the bolts 4 and nuts 5 are assembled. Jack bolts 22 are then inserted into threaded holes 23 and the centering plug 10 is moved into its centering position between the two rotors (Fig. 2). The centering plug is thus forced over until the edge of groove 15 is in exact alignment with the surface 27 of rotor 1. The bolts 4 and the jack bolts 22 are then removed and the coupling flanges are again forced apart by jack bolts 20, so that the temporary spacer may be removed and a permanent spacer 3 of proper thickness and with a lip 16 inserted in the groove 15 to prevent the centering plug from moving axially. The jack bolts 20 are then removed and the coupling bolts 4 reassembled.

To disassemble the coupling the following procedure is followed.

The bolts 4 are removed and the couplings are jacked apart in the manner described above, allowing for removal of the sectional spacer 3. The centering plug can then be jacked axially over into the recess 14 (Fig. 3) by inserting jack bolts 24 into holes 25. The rotors may then be moved transversely relative to each other.

Thus it will be seen that the invention provides for a coupling assembly with a centering device which remains tightly fitted relative to the coupling during high speed operation.

While a single embodiment of the invention has been described in detail herein, it will be obvious to those skilled in the art that certain changes and substitutions of equivalents may be made. For example, the coupling assembly is not limited in use to connect two rotors of a steam turbine together. It can be used to couple and center any two members which operate at high speeds and at a higher temperature than when at rest. It is of course desired to cover all such modifications that fall within the function and scope of the invention as defined in the claims.

What I claim as new and desire to secure by Letters Patent of the United States is:

1. In a rotor coupling assembly subject to increased temperature during normal operation, the combination of rotor end portions defining adjacent radially extending flange portions, means securing said flange portions together, each of said rotor end portions defining an adjacent axial recess, a centering plug having opposite end portions disposed in said recesses, said plug end portions being at least equal in diameter to the diameters of said respective recesses whereby the plug serves to center the rotor end portions relative to each other, the plug being made of a material having a substantially greater coefficient of thermal expansion than the rotor end portions whereby when the coupling rotates at high speed and elevated temperatures during normal operation the plug will expand thermally relative to the rotor end portions to maintain the plug tight in said recesses irrespective of expansion of the rotor end portions due to centrifugal force.

2. In a rotor coupling assembly subject to increased temperature during operation, the combination of rotor end portions defining adjacent radially extending flange portions, a spacer member located between the flange portions to align the rotor end portions relative to each other after being assembled, means securing said flange portions and intermediate spacer member together, each of said rotor end portions defining an adjacent axial recess, a centering plug having opposite end portions disposed in said recesses, said plug end portions being at least equal in diameter to the diameters of said respective recesses whereby the plug serves to center the rotor end portions relative to each other, the plug defining a circumferential groove, the spacer member defining a lip portion adapted to extend into the groove to prevent axial movement of the plug, the plug being made of a material having a greater coefficient of thermal expansion than the rotor end portions whereby when the coupling rotates at high speed and elevated temperature due to transfer of heat thereto during normal operation, the plug will expand thermally relative to the rotor end portions to maintain the plug tight in said recesses irrespective of expansion of the rotor end portions due to centrifugal force.

3. A rotor coupling assembly in accordance with claim 2 and including an axially disposed dowel pin secured to one of the rotor end portions and extending into the axial recess thereof, the plug defining a cooperating recess in its end surface and receiving the pin, said pin and recess being spaced radially from the axes of the rotors whereby the plug may be inserted in the rotor recess only in one orientation relative to the rotor.

4. A rotor coupling assembly in accordance with claim 2 in which at least one of the axial rotor recesses is of an axial depth sufficiently great that the centering plug may be moved axially thereinto, and means for moving the centering plug axially into said recess to permit the movement of one of the rotor end portions transversely relative to the other.

5. In a rotor coupling assembly subject to increased temperature during operation, the combination of rotor end portions defining adjacent radially extending flange portions, an annular spacer member disposed between the flange portions to align the rotor end portions relative to each other, a circumferential row of bolts securing said flange portions and intermediate spacer member together, each of said rotor end portions defining an adjacent axial recess, a pin secured to one of said rotor end portions and extending into the axial recess thereof, a centering plug having opposite end portions disposed in said recesses, said plug end portions being at least equal in diameter to the diameters of said respective recesses whereby the plug serves to maintain the rotor end portions in coaxial relation, the plug defining a circumferential groove and the spacer member defining a radially inwardly projecting lip portion adapted to extend into the groove to prevent axial movement of the plug, said plug defining a recess in one end face thereof and receiving said pin, the pin and cooperating recess being located off center whereby the plug may be assembled in only one orientation, the plug being of a material having a substantially greater coefficient of thermal expansion than the rotor end portions whereby when the coupling rotates at high speed and elevated temperatures during normal operation the plug will expand thermally relative to the rotor end portions to maintain the plug tight in said recesses irrespective of expansion of the rotor end portions due to centrifugal force, the rotor end portions defining threaded holes adapted to receive jack bolts for separating the rotor end portions and for moving the centering plug axially into one of said axial recesses for allowing the rotor end portions to be moved transversely relative to each other.

References Cited in the file of this patent

UNITED STATES PATENTS

| | | |
|---|---|---|
| 443,627 | Nicholson | Dec. 30, 1890 |
| 2,084,862 | Moser | June 22, 1937 |
| 2,575,641 | Summers | Nov. 20, 1951 |

FOREIGN PATENTS

| | | |
|---|---|---|
| 392,220 | France | of 1908 |